United States Patent
Kent et al.

(10) Patent No.: US 11,579,459 B2
(45) Date of Patent: Feb. 14, 2023

(54) POLYCHROMATOR SYSTEMS AND METHODS

(71) Applicant: Agilent Technologies, Inc., Santa Clara, CA (US)

(72) Inventors: Sean M. Kent, Hughesdale (AU); Lindsay Buck, Melbourne (AU)

(73) Assignee: Agilent Technologies, Inc., Santa Clara, CA (US)

(*) Notice: Subject to any disclaimer, the term of this patent is extended or adjusted under 35 U.S.C. 154(b) by 298 days.

(21) Appl. No.: 16/768,506

(22) PCT Filed: May 2, 2018

(86) PCT No.: PCT/IB2018/053020
§ 371 (c)(1),
(2) Date: May 29, 2020

(87) PCT Pub. No.: WO2019/106443
PCT Pub. Date: Jun. 6, 2019

(65) Prior Publication Data
US 2020/0379270 A1     Dec. 3, 2020

(30) Foreign Application Priority Data
Nov. 30, 2017 (AU) ................. 2017904837

(51) Int. Cl.
*G01J 3/12* (2006.01)
*G02B 27/42* (2006.01)
(Continued)

(52) U.S. Cl.
CPC .......... *G02B 27/4277* (2013.01); *G01J 3/021* (2013.01); *G01J 3/0208* (2013.01);
(Continued)

(58) Field of Classification Search
CPC .......... G01J 3/1809; G01J 3/12; G01J 3/1208
See application file for complete search history.

(56) References Cited

U.S. PATENT DOCUMENTS

2012/0262713 A1   10/2012   Florek et al.
2013/0182250 A1    7/2013   McClure

FOREIGN PATENT DOCUMENTS

CN   102226716 A   10/2011
CN   102656431 A    9/2012
(Continued)

OTHER PUBLICATIONS

Xiao Fu, "Astigmatism-corrected echelle spectrometer using an off-the-shelf cylindrical lens", Sep. 27, 2017 (Year: 2017).*
Li Xu, "Design of freeform mirrors in Czerny-Turner spectrometers to suppress astigmatism", May 12, 2009 (Year: 2009).*
Garrard, et al., "Design Tools For Freeform Optics", Current Developments in Lens Design and Optical Engineering VI, vol. 5874. International Society for Optics and Photonics, 2005, 1-11.
(Continued)

*Primary Examiner* — Maurice C Smith

(57) ABSTRACT

A polychromator system comprising: an optical element defining an aperture; a collimation mirror for receiving light via the aperture and reflecting substantially collimated light; at least a first dispersive optical component and a second dispersive optical component, each configured to disperse the substantially collimated light received from the collimation mirror by different amounts for different wavelengths and to provide cross-dispersed light having different wavelengths of light spaced along a first and second axis; and a focus mirror positioned to focus the cross-dispersed light onto a 2-D array detector to provide a plurality of aperture images of the aperture at a respective plurality of regions of the detector, each of the plurality of aperture images associated with a respective wavelength of the cross-dispersed
(Continued)

light. Either one or both of the collimation mirror and the focus mirror is a freeform mirror having a reflective surface configured to mitigate effects of optical aberrations of the polychromator system over a plurality of the wavelengths of the cross-dispersed light along the first axis and the second axis and thereby optimise the resolution of the plurality of aperture images associated with the plurality of the wavelengths along the first axis and the second axis.

19 Claims, 9 Drawing Sheets

(51) Int. Cl.
  *G01J 3/02* (2006.01)
  *G01J 3/18* (2006.01)
  *G01J 3/26* (2006.01)
  *G02B 17/06* (2006.01)
  *G02B 27/00* (2006.01)
  *G02B 27/10* (2006.01)
  *G02B 27/30* (2006.01)

(52) U.S. Cl.
  CPC ............ *G01J 3/12* (2013.01); *G01J 3/189* (2013.01); *G01J 3/26* (2013.01); *G02B 17/0621* (2013.01); *G02B 27/0012* (2013.01); *G02B 27/1013* (2013.01); *G02B 27/30* (2013.01); *G01J 2003/1208* (2013.01)

(56) References Cited

FOREIGN PATENT DOCUMENTS

| DE | 19708462 A1 * | 8/1998 | ............ G01J 3/1809 |
|---|---|---|---|
| DE | 102016124980 A1 | 8/2017 | |
| JP | S6156921 A | 3/1986 | |
| JP | H07301560 A | 11/1995 | |
| JP | 2008233248 A | 10/2008 | |
| JP | 2015503764 A | 2/2015 | |
| JP | 2015535342 A | 12/2015 | |
| WO | 0169190 A1 | 9/2001 | |
| WO | 2013017458 A1 | 2/2013 | |
| WO | 2016200816 A1 | 12/2016 | |
| WO | WO-2017121583 A1 * | 7/2017 | ............ G01J 3/0208 |

OTHER PUBLICATIONS

Goodwin, et al., "Design & Implementation of a New Freeform Surface Based on Chebyshev Polynomials", Freeform Optics, Optical Society of America, 2015, 16 pages.

International Search Report and Written Opinion dated Jul. 3, 2018, Application No. PCT/IB2018/053020, 9 pages.

Zhu, et al., "Design Method of Surface Contour for a Freeform Lens With Wide Linear Field-of-view", Optics Express; vol. 21, No. 22, 2013, 26080-26092.

* cited by examiner

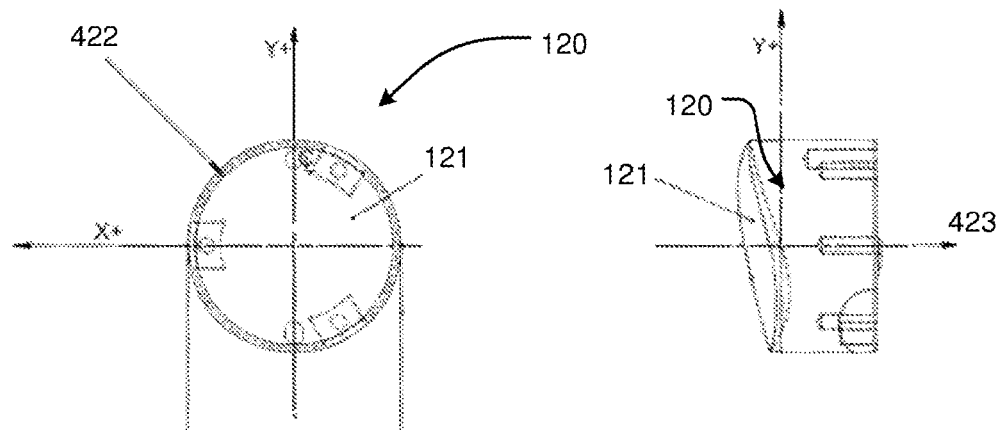
Figure 4a
Figure 4b
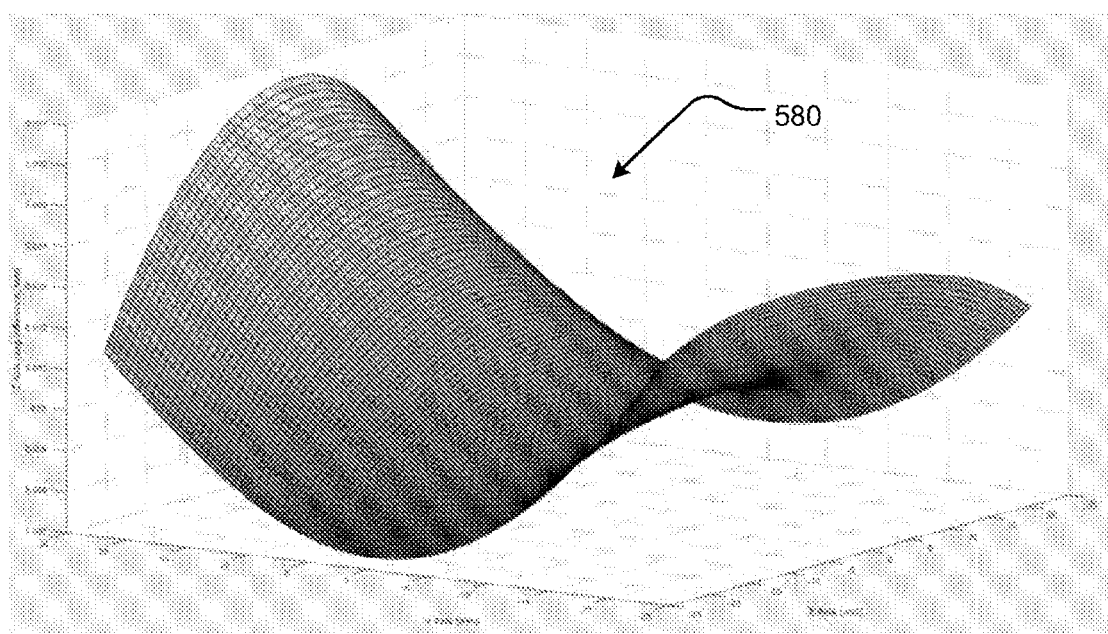
Figure 5

POLYCHROMATOR SYSTEMS AND METHODS

CROSS-REFERENCE TO RELATED APPLICATION

This application is a national stage entry pursuant to 35 U.S.C. § 371 of International Application No. PCT/IB2018/053020, filed on May 2, 2018, which claims the benefit of Australian Patent Application No. 2017904837, filed Nov. 30, 2017, the contents of which are incorporated by reference in their entirety.

TECHNICAL FIELD

The present disclosure generally relates to polychromators or polychromator systems, and more specifically, polychromators or polychromator systems for use in spectrometers or optical systems for spectroscopy. The present disclosure also relates to methods of determining optimised shapes for freeform mirrors for such polychromator systems.

SUMMARY

Some embodiments relate to a polychromator system comprising: an optical element defining an aperture; a collimation mirror for receiving light via the aperture and reflecting substantially collimated light; at least a first dispersive optical component and a second dispersive optical component, each configured to disperse the substantially collimated light received from the collimation mirror by different amounts for different wavelengths and to provide cross-dispersed light having different wavelengths of light spaced along a first and second axis; and a focus mirror positioned to focus the cross-dispersed light onto a 2-D array detector to provide a plurality of images of the aperture at a respective plurality of regions of the detector, each of the plurality of aperture images associated with a respective wavelength of the cross-dispersed light; wherein either one or both of the collimation mirror and the focus mirror is a freeform mirror having a reflective surface configured to mitigate effects of optical aberrations of the polychromator system over a plurality of the wavelengths of the cross-dispersed light along the first axis and the second axis and thereby optimise the resolution of the plurality of aperture images associated with the plurality of the wavelengths along the first axis and the second axis.

In some embodiments, the second optically dispersive element is oriented relative to the first optically dispersive element such that the second axis is substantially perpendicular to the first axis.

In some embodiments, the first dispersive optical component is configured to receive collimated light from the collimation mirror and to disperse the substantially collimated light by different amounts for different wavelengths along the first axis to provide dispersed light; and the second dispersive optical component is configured to further disperse the dispersed light by different amounts for different wavelengths along the second axis to provide the cross-dispersed light.

In some embodiments, the first dispersive optical element is configured to separate the light into a dispersed spectrum with overlapping orders along the first axis and the second dispersive optical element is configured to separate the light into different order spectra along the second axis. In other embodiments, the second dispersive optical element is configured to separate the light into a dispersed spectrum with overlapping orders along the second axis and the first dispersive optical element is configured to separate the light into different order spectra along the first axis.

In some embodiments, the first dispersive optical component comprises a diffraction grating and the second dispersive optical component comprises a prism. In other embodiments, the second dispersive optical component comprises a diffraction grating and the first dispersive optical component comprises a prism. In other embodiments, the first dispersive optical component comprises a first diffraction grating and the second dispersive optical component comprises a second diffraction grating.

In some embodiments, the collimation mirror is a freeform mirror and the focus mirror is any one of: (i) a spherical concave mirror, (ii) a toric concave mirror, and (iii) a parabolic concave mirror. In some embodiments, the focus mirror is a freeform mirror and the collimation mirror is any one of: (i) a spherical concave mirror, (ii) a toric concave mirror, and (iii) a parabolic concave mirror.

In some embodiments, the reflective surface of either one or both of the collimation mirror and focus mirror is described by a polynomial. The reflective surface of the collimation mirror may be described by:

$$z(x, y) = \frac{cr^2}{1 + \sqrt{1 - (1+k)c^2 r^2}} + \sum_{i=1}^{35} A_i \times E_i(x, y)$$

$$\text{where } r = \sqrt{x^2 + y^2},$$

and where z is the height along an optical axis, x is the position along first axis and y is position along the second axis.

In some embodiments, the second dispersive optical component is further configured to provide the cross-dispersed light to the first dispersive optical component and the first dispersive optical component is configured to disperse the wavelengths further along the first axis and to provide the further cross-dispersed light to the focus mirror.

Some embodiments relate to a method of optimising a reflective surface of a freeform mirror for a polychromator system, the method comprising:

(i) initialising a model of the reflective surface of the freeform mirror;

(ii) simulating an aperture image at two or more wavelengths of light;

(iii) determining a location of the aperture image relative to a detector surface of a simulated detector of the polychromator system;

(iv) responsive to determining that the aperture image is not located on the detector surface, adjusting the model of the reflective surface of the freeform mirror to adjust a shape of the reflective surface;

(v) responsive to determining that the aperture image is located on the detector surface, determining one or more characteristics for the aperture image at the two or more wavelengths of light;

(vi) calculating a merit value based on a comparison of the one or more characteristics of the aperture image with respective one or more characteristics of a reference image;

(vii) responsive to determining that the merit value exceeds a threshold value, repeating steps (iv) to (vi); and (viii) responsive to determining that the merit value is less than a threshold value, determining that the reflective surface of the freeform mirror is optimised.

In some embodiments, determining one or more characteristics of the aperture image at the two or more wavelengths of light comprises determining any one or more of: (i) one or more dimensions the image, (ii) intensity of light in the image, and (iii) location of the image on the detector surface.

In some embodiments, the reference image comprises a target image.

In some embodiments, adjusting the model of the reflective surface comprises adjusting one or more coefficients of terms of the model. Initializing the model may comprise selecting coefficients of terms of the model such that the reflective surface approximates a spherical mirror.

In some embodiments, initialising a model of a reflective surface of the freeform mirror may comprise initialising a first model of a first reflective surface of the first freeform mirror and initialising a second model of a second reflective surface of the second freeform mirror and adjusting the model of the reflective surface may comprise adjusting one or more coefficients of terms of the first model of the first reflective surface and/or one or more coefficients of terms of the second model of the second reflective surface.

In some embodiments, the method comprises responsive to determining that a predetermined number of adjustments to the model have been made and/or a predetermined period of time has elapsed since the simulation was initiated, determining that the reflective surface of the freeform mirror is optimised.

In some embodiments, the method comprises simulating the polychromator system according to a simulation model, wherein the simulated model comprises the model of the reflective surface of the freeform mirror and one or more models representative of other components of the polychromator system.

In some embodiments, the method further comprises adjusting free parameters of the model of the reflective surface of the freeform mirror and/or the one or more models of the other components of the polychromator system in response to determining that at least one of the aperture images is not located on the detector surface. The method may further comprise adjusting free parameters of the model of the reflective surface of the freeform mirror and/or the one or more models of the other components of the polychromator system in response to determining that the merit value is less than a threshold value.

In some embodiments, the target image is indicative of an image produced by the polychromator system when wavelength resolution of multiple rows of wavelength ranges of cross dispersed light extending along a first axis of the detector of the polychromator system is optimised and order resolution of cross dispersed light along a second axis of the detector of the polychromator system is optimised.

Some embodiments relate to a method of fabricating a freeform mirror for a polychromator system, the method comprising:

performing the method of any one of disclosed embodiments to determine an optimised shape for a reflective surface of the freeform mirror; and fabricating the freeform mirror according to the determined optimised shape.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

BRIEF DESCRIPTION OF DRAWINGS

Embodiments are described in further detail below, by way of example, with reference to the accompanying drawings briefly described below:

FIG. 4a is a front view of a collimation mirror of the polychromator system of FIG. 1;

FIG. 4b is an exaggerated side view of the collimation mirror of FIG. 4a;

FIG. 5 is a plot of deviation of a reflective surface of the collimation mirror of FIGS. 4a and 4b from a spherical surface;

DESCRIPTION OF EMBODIMENTS

Figure 1:
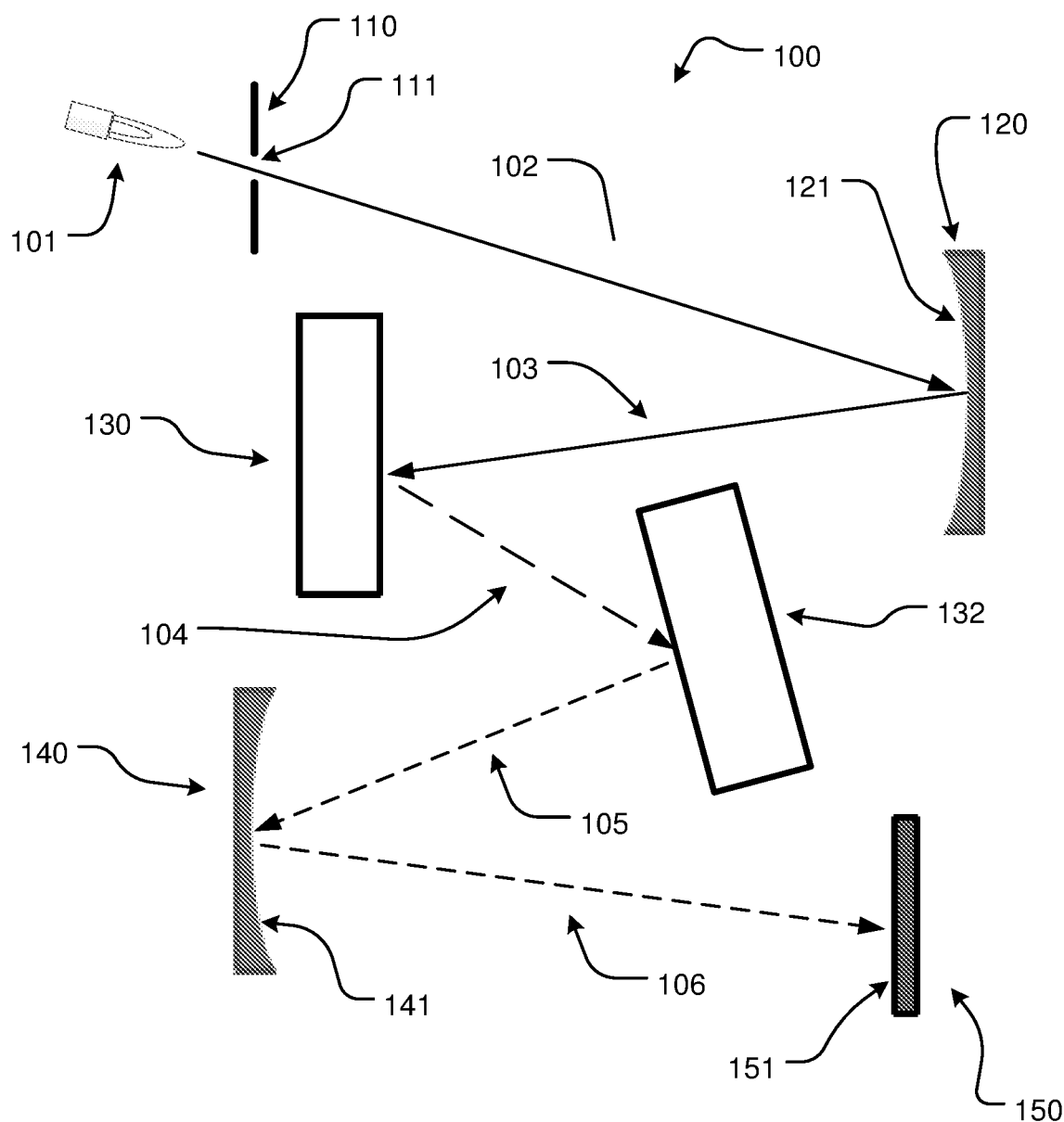
FIG. 1 is a schematic of a polychromator system, according to some embodiments.

Described embodiments generally relate to polychromators or polychromator systems, and more specifically, polychromators or polychromator systems for use in spectrometer optical systems for spectroscopy. Some embodiments also relate to methods of determining optimised shapes for freeform mirrors for such polychromator.

Light emitted by a chemical sample when energized typically comprises light at a plurality of discrete and different characteristic wavelengths which are seen as peaks in an intensity spectrum (emission lines). Spectro-chemical analysis involves producing and analysing the spectrum of the emitted light using a spectrometer. To produce a spectrum, spectrometers may use a system of optical elements to disperse different wavelengths onto different portions of a detector. The system of optical elements may, for example, comprise a spectrograph or a polychromator, which are used here interchangeably. A polychromator is an optical device that accepts multi-wavelength light through an entrance slit or aperture, separates the light into one or more different wavelength ranges using dispersive elements such as prisms and/or diffraction gratings, and focuses multiple aperture images onto one or more detectors so that the wavelength ranges can be detected, measured and/or recorded. Polychromators typically produce a single row of wavelengths for detection by a one or two dimensional array detector. However, very high-resolution spectrometers, such as echelle spectrometers, are designed to enable measurement of a wide range of wavelengths simultaneously on a detector by producing multiple rows of wavelengths for illuminating a two dimensional array detector.

However, polychromators, like many optical systems, tend to suffer from optical aberrations such as coma and spherical aberrations. Although a reasonably accurate aperture image may be projected onto the detector for wavelengths that are focussed towards the centre of the detector (i.e., along the ideal ray path axis), as a result of the aberrations, more optically distorted or smeared aperture images (light patches) are realised for wavelengths that are focussed away from the centre of the detector. As a result of such optical aberrations, many existing polychromators have long focal lengths and high f-numbers to achieve the required spectral resolution. Thus, classical mirror shapes tend to limit to how small the polychromator can be before optical aberrations become unacceptable.

However, it has been recognised by the inventors that light patches associated with the distorted aperture images tend to spread out along both the X-axis (wavelength axis) and along the Y-axis (order axis) of the detector surface, which contributes to poor resolution. In particular, the light patches comprise multiple rows of wavelength ranges of cross dispersed light extending along the X-axis, with light spreading out along the rows (contributing to poor wavelength resolution) and spreading out orthogonally to the rows, along the Y-axis (contributing to poor order resolution). Accordingly, where a detector comprises a plurality of lines of detection pixels, each line arranged to accommodate a respective row of wavelength ranges, light may fall off the top and bottom of each pixel of a row of pixels of the detector and may overlap with light from another row or order when the light is spread along the Y-axis.

Described embodiments relate to polychromator systems and methods of designing polychromator systems which comprise at least one freeform mirror having a reflective surface configured to mitigate effects of optical aberrations of the polychromator system. For example, one or both of a collimation mirror and focus mirror of the polychromator system may comprise a freeform mirror. In some embodiments, the at least one freeform mirror is configured to optimise wavelength resolution of multiple rows of wavelength ranges of cross dispersed light, each row extending along a first axis of a detector of the polychromator system. In some embodiments, the at least one freeform mirror is further configured to optimise order resolution of cross dispersed light along a second axis of the detector of the polychromator system. The second axis may be perpendicular to the first axis.

More particularly, the reflective surface of the freeform mirror of either or both of the collimation mirror and focus mirror of the polychromator system may be configured or shaped to optimise the resolution of the produced aperture image along both the X-axis and the Y-axis of detector. Accordingly, more light may be captured on a smaller area (e.g. light detecting pixel) of the detector, thereby increasing the sensitivity of the polychromator system, and the sensitivity of an instrument, such as a spectrometer, that comprises the described polychromator system. For example, less light will fall off the top and bottom of each of the pixels of the detector as the light is more tightly focused onto the pixels. Further, inter-order overlap, (i.e., light from one row of wavelengths spreading over a neighbouring row of wavelengths), is reduced, thereby mitigating the likelihood of false detection of wavelengths. By increasing the amount of light focused onto the pixels, the signal to noise ratio is increased, and the detection limits of the instrument are improved. Further, such increased sensitivity means that the polychromator system and/or spectrometer may be provided with an improved ability to resolve spectral interferences such as overlap from peaks at different wavelengths or overlap from spectra of different order (inter-order interference).

Referring to FIG. 1, a polychromator or polychromator system 100 for spectroscopy is shown, according to some embodiments. The polychromator system 100 comprises an optical element 110 defining an aperture 111, a collimation mirror 120, a first dispersive optical element 130 configured to disperse different wavelengths of light along a first axis (not shown), a second dispersive optical element 132 configured to disperse different wavelengths of light along a second axis (not shown) different to the first axis, and a focus mirror 140. In some embodiments, the polychromator system 100 further comprises a detector 150 comprising a detector surface 151.

The optical element 110 is arranged with respect to a light source 101 to allow light from the light source 101 to travel through the aperture 111.

The collimation mirror 120 is positioned relative to the optical element 110 to receive light 102 produced at the light source 101 via the aperture 111 and to reflect substantially collimated light. In some embodiments, the collimation mirror 120 comprises a reflective surface 121 that may be rotationally asymmetric about a central axis (not shown). Accordingly, the collimation mirror 120 may comprise a freeform mirror.

In some embodiments, the collimation mirror 120 is associated with a mask (322, FIG. 3a), for example, positioned in front of the reflective surface 121. The mask 322 defines a mask aperture (not shown) to limit the angle of incidence of light 102 received by the collimation mirror 120. The collimation mirror 120 and the first dispersive optical element 130 are positioned relative to one another to enable the first dispersive optical element 130 to receive light 103 reflected by the collimation mirror 120. The mask 322 may affect the intensity of light in the aperture image and may influence the optical aberrations of the polychromator system by affecting the area of the reflective surface 121 of the collimation mirror 120. A smaller mask aperture leading to a smaller area of the reflective surface 121 which may have a smaller overall curvature compared to if a larger mask aperture was used. The smaller overall curvature may therefore reduce optical aberrations.

The first dispersive optical element 130 is configured to disperse the light 103 along the first axis to provide dispersed light 104. In some embodiments, the first dispersive optical element 130 is configured to change an angle of the light by different amounts for different wavelengths. The dispersed light 104 may be substantially collimated i.e., the first dispersive optical element 130 may change the angle of the light by different amounts for different wavelengths without substantially affecting the collimation of the light 103 reflected by the collimation mirror. The first dispersive optical element 130 and the second dispersive optical element 132 are positioned relative to one another to enable the second dispersive optical element 132 to receive the dispersed light 104 from the first dispersive optical element 130.

The second dispersive optical element 132 is configured to cross-disperse the received dispersed light 104 along the second axis (not shown) to provide cross-dispersed light 105 spaced along the first axis and second axis. For example, the second dispersive optical element 132 may be configured to disperse the received dispersed light 104 in a different direction that is nominally "across" a direction in which the dispersed light 104 was dispersed by the first dispersive optical element 130. In some embodiments, the second dispersive optical element 132 is configured to change an angle of the received dispersed light 104 by different amounts for different wavelengths. The cross-dispersed light 105 may be substantially collimated i.e., the second dispersive optical element 132 may change the angle of the light by different amounts for different wavelengths without substantially affecting the collimation of the dispersed light 104 received from the first dispersive optical element 130. In some embodiments, the first and second axes are perpendicular to one another. For example, the second dispersive optical element 132 may be oriented relative to the first dispersive optical element 130 such that the first and second axes are substantially perpendicular to one another.

Thus, in some embodiments, the first dispersive optical element 130 separates the light into a dispersed spectrum with overlapping orders and the second dispersive optical element 132 separates the light into different order spectra along the second axis. However, in other embodiments, the second dispersive optical element 132 separates the light into a dispersed spectrum with overlapping orders along the first axis and the first dispersive optical element 130 separates the light into different order spectra along the second axis. For example, the first dispersive optical element 130 may be configured to disperse the light 103 along the second axis (order axis) and the second dispersive optical element 132 may be configured to disperse the dispersed light 104 along the first axis (wavelength axis) to provide the cross-dispersed light 105.

Either the first dispersive optical element 130 or the second dispersive optical element 132 produces a dispersed but overlapped spectrum, and the other of the first dispersive optical element 130 and the second dispersive optical element 132 separates the overlaps in a different direction (e.g. second axis).

Referring again to FIG. 1, the focus mirror 140 and the second dispersive optical element 132 are positioned relative to one another to enable the focus mirror 140 to receive the cross-dispersed light 105.

Figure 3A:
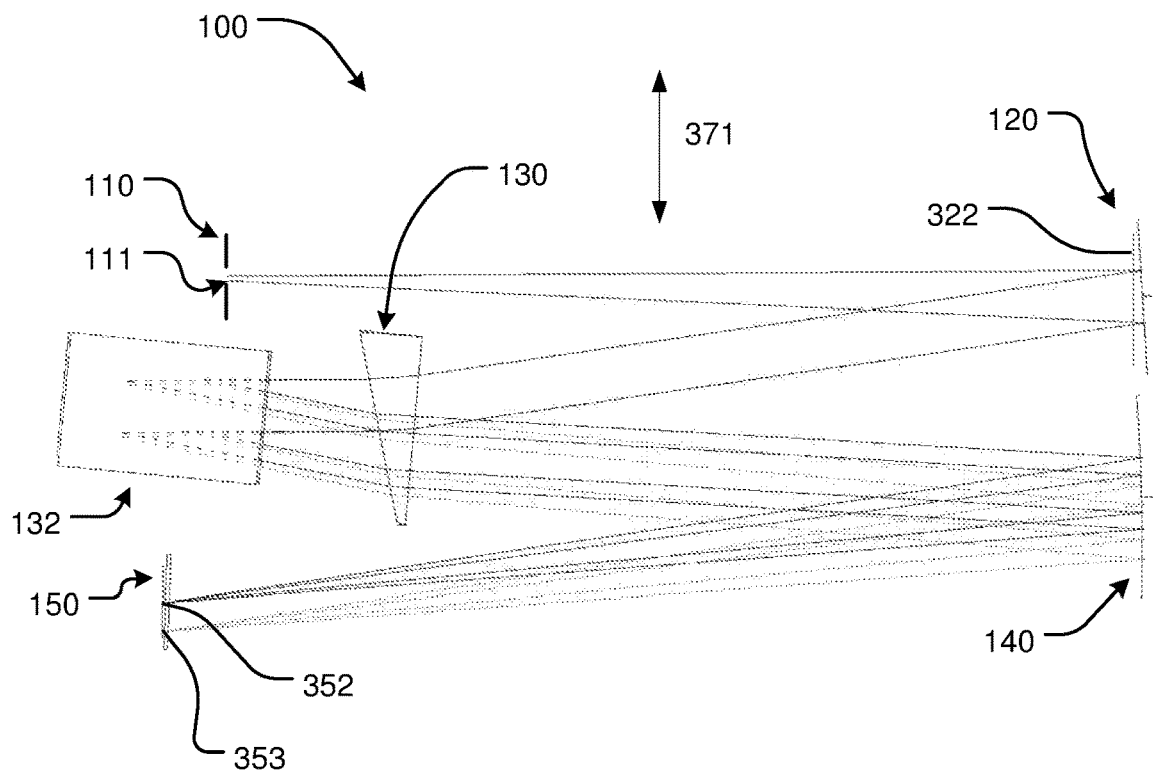
FIG. 3a is a top view of a polychromator system and an associated ray diagram, according to some embodiments.
Figure 3B:
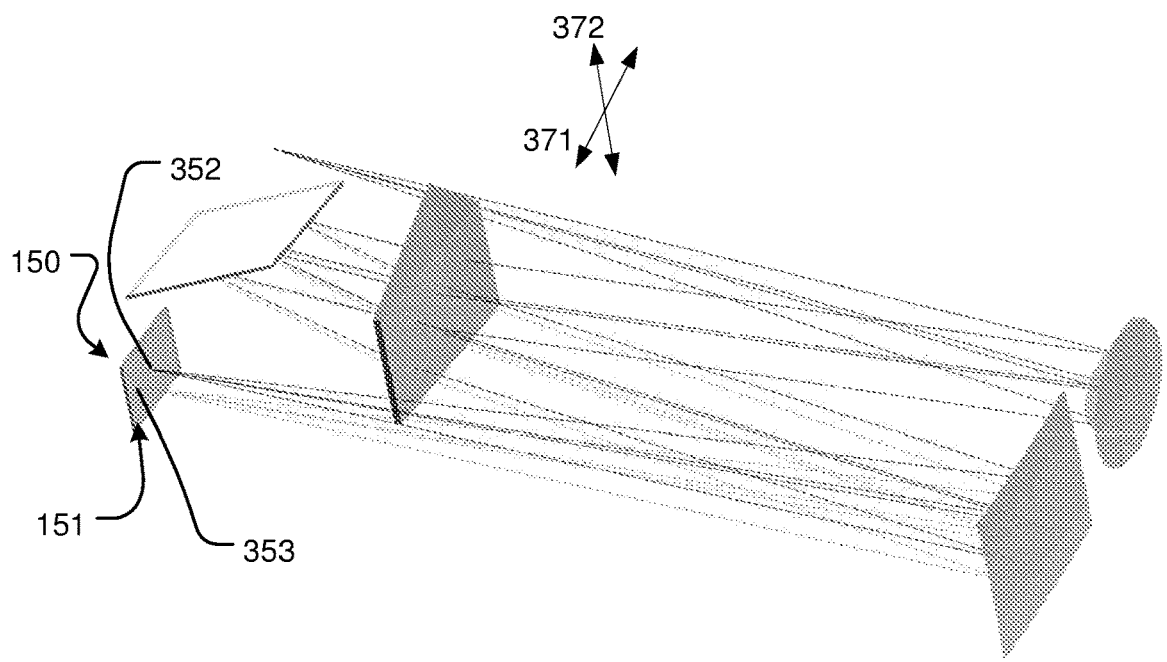
FIG. 3b is a perspective view of the polychromator system of FIG. 3a and an associated ray diagram.

As shown in FIG. 3a and FIG. 3b, in some embodiments, the second dispersive optical element 132 and the first dispersive optical element 130 are positioned relative to one another such that the cross-dispersed light 105 is further provided to the first dispersive optical element 130 from the second dispersive optical element 132 and wavelengths are further dispersed along the first axis. In this embodiments, the first dispersive optical element 130 then provides the further cross-dispersed light to the focus mirror 140.

In some embodiments, the first dispersive optical element 130 or second dispersive optical element 132 disperses different wavelengths of light as a result of refraction. For example, the first dispersive optical element 130 or second dispersive optical element 132 may comprise a prism. The prism may be formed from fused silica for dispersing visible wavelengths of light. If the wavelengths of interest for spectroscopy include ultraviolet and/or infrared wavelengths the prism may, for example, be fabricated from calcium fluoride ($CaF_2$) or barium fluoride ($BaF_2$).

In some embodiments, the first dispersive optical element 130 or second dispersive optical element 132 disperses different or separate wavelengths of light as a result of diffraction. For example, the first dispersive optical element 130 or second dispersive optical element 132 may comprise a diffraction grating such as an echelle grating. The echelle grating may comprise a relatively low density of grating lines optimized for diffraction at relatively high incidence angles.

In some embodiments the first dispersive optical element 130 and/or second dispersive optical element 132 may comprise a plurality of prisms or diffraction gratings.

Figure 2:
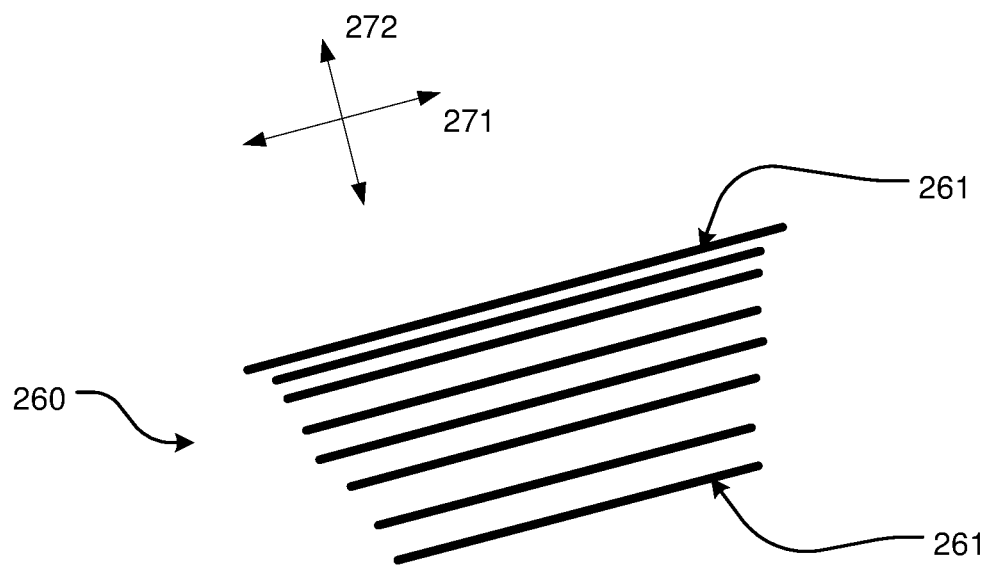
FIG. 2 is a schematic representation of a plurality of spectra produced by the polychromator system of FIG. 1.

As shown in FIG. 2, the first and second dispersive optical elements 130, 132 effectively separate the light 103 received from the collimator 120 into one or more spectra 260 with different wavelengths ranges to be projected into a detector 150. For example, and as shown in FIG. 2, the second dispersive optical element 132 and the first dispersive optical element 130 may be oriented such that each spectrum 261 of the plurality of spectra 260 are separated from each other along the second axis 272 and the wavelengths within each spectrum 261 are separated along a first axis 271. Each spectrum 261 may be characterised by a different order of diffraction.

The focus mirror 140 is configured to reflect and focus the cross-dispersed light 105 and to provide focused light 106 to the detector 150. In some embodiments, the focus mirror 140 is configured to focus the cross-dispersed light 105 onto the detector surface 151 of the detector 150 to provide the plurality of spectra 260. In some embodiments, the detector 150 is positioned with respect to the focus mirror 140 such that the detector surface 151 is located at the focal plane of the focus mirror 140. In some embodiments, the detector surface 151 extends along the first axis and the second axis.

In some embodiments, the focus mirror 140 comprises a reflective surface 141 that is concave and parabolic. In other embodiments, the focus mirror 140 comprises a reflective surface 141 that is concave and spherical. In other embodiments, the focus mirror 140 comprises a reflective surface 141 that is concave and toric. In some embodiments, the focus mirror 140 is a freeform mirror. In some embodiments, the focus mirror 140 comprises a spherical focus mirror. Advantageously, spherical focus mirrors are less sensitive to X-Y positioning errors, which may be corrected by tipping or tilting the focus mirror to match the design spherical curved surface position required and thereby making manufacturing and adjustment relatively easy. A further benefit of a spherical focus mirror is that it is less sensitive to radius tolerance errors, as these can be corrected by moving the mirror towards or away from the detector to match the designed spherical curved surface position, making the focus mirror relatively cheap.

Thus, in some embodiments, either one or both of the focus mirror 140 and the collimating mirror 120 is a freeform mirror. In some embodiments, the reflective surface 121 of the collimating mirror 120 comprises a spherical concave mirror or a parabolic concave mirror or a toric concave mirror and the focus mirror 140 is a freeform mirror. In some embodiments, the reflective surface 141 of the focus mirror 140 comprises a spherical concave mirror or a parabolic concave mirror or a toric concave mirror and the collimating mirror 120 is a freeform mirror. In some embodiments, both the collimating mirror 120 and the focus mirror 140 are freeform mirrors.

Referring to FIGS. 1, 3a and 3b, in use, light from the light source 101 entering the system 100 through the aperture 111 of the optical element 110 is collimated or substantially collimated by the collimation mirror 120. The first and second dispersive optical elements 130, 132 bend or disperse the collimated light by different amounts for different wavelengths to produce cross-dispersed light 105 and the focus mirror 140 focuses the cross-dispersed light 105 onto the detector surface 151 of the detector 150 to produce images of the aperture 111 of the optical element 110 as patches of light for each wavelength. For example, a first wavelength of light received by the system 100 may be focussed onto a respective first area 352 of the detector surface 151 and a second wavelength of light received by the system 100 may be focussed onto a respective second area 353 of the detector surface 151.

The polychromator system 100 has a single discrete wavelength that will travel the length of the system on the ideal optical axis, and can be arranged to be focused as an aperture image at the geometric centre of the detector surface 151. Aperture images at all other wavelengths will be offset from the centre of the detector surface 151. For wavelengths that will travel through the system 100 relatively close to the ideal optical axis, the refraction and diffraction angles of the first and second dispersive optical elements 130, 132, respectively, will be relatively small. Accordingly, regions of the focus mirror 140 used to reflect and focus wavelengths relatively close to the ideal optical axis will substantially overlap with each other and/or with a region of the focus mirror 140 used to reflect and focus the wavelength on the ideal optical axis. Every wavelength travelling through system 100 has a different (albeit in some case subtly different) focus mirror shape requirement to produce an aperture image that is in-focus and substantially aberration free on the detector surface 151 and there is no mathematically perfect solution that can be simultaneously appropriate for all the different incident angles of light 105 from every wavelength being received by the focus mirror 140. Thus, although light from the wavelength following the ideal optical axis path may produce a relatively focussed aperture image 652 (FIG. 6a) on the detector surface 151, aperture images associated with other wavelengths may produce less focussed or blurred or aberrated aperture images. As a result, light reflected by the focus mirror 140 may suffer from optical aberrations. Further, the optical aberrations at each of a plurality of different wavelengths may vary as a result of different wavelengths being reflected by different regions of the focus mirror 140. The resolution of a spectrometer comprising the polychromator system 100 may therefore vary over different wavelength ranges.

The resolution of the polychromator system 100 is, in part, determined by how well different wavelengths of light can be distinguished (resolved) from each other as light projected onto the different areas of the detector surface 151 and therefore depends on the optical aberrations of light at each of the plurality of different wavelengths. A polychromator system 100 having relatively lower optical aberrations advantageously enables relatively high resolution spectroscopy to be performed by distinctly separating adjacent areas of aperture images projected onto the detector surface 151. Dispersion of wavelengths thereby assists in distinguishing between detected light (emission lines) at adjacent wavelengths. Poor resolution affects the ability to separate or distinguish one emission line from neighbouring or other nearby emission lines. Poor resolution may also degrade detection limits for emission lines as the light energy from an emission line is spread over a larger range of detector pixels and the peak intensity (or signal to noise) of the emission line is reduced.

In some embodiments, the collimation mirror 120 of the polychromator system 100 comprises a freeform mirror having a reflective surface configured to mitigate effects of optical aberrations of the polychromator system 100, such as the collimation mirror 120, the focus mirror 140 and/or any other components of the polychromator system 100. For example, the collimation mirror 120 may be configured to pre-correct at least some of the optical aberrations, such as spherical aberrations, of the focus mirror 140 to thereby allow for the projection of more focused aperture images onto the detector. In some embodiments, the reflective surface 121 of the collimation mirror 120 comprises a cross-section (FIG. 4b) through the central axis 423 that is non-parabolic and aspherical in shape. In some embodiments, the reflective surface 121 of the collimation mirror 120 is shaped to optimise the collimation of light 102 received from the aperture 111. The optimised shape of the reflective surface 121 may assist in collimating light 102 that is off-axis from an optical axis (not shown).

In some embodiments, the focus mirror 140 of the polychromator system 100 comprises a freeform mirror having a reflective surface configured to mitigate effects of optical aberrations of the polychromator system 100, such as the collimation mirror 120, the focus mirror 140 and/or any other components of the polychromator system 100.

In particular, the reflective surface of the freeform mirror of the collimation mirror 120 and/or focus mirror 140 is configured or shaped to mitigate effects of optical aberrations of the polychromator system over a plurality of the wavelengths of the cross-dispersed light along the first axis and the second axis and thereby optimise the resolution of the plurality of aperture images associated with the plurality of the wavelengths along both the first axis and the second axis. Therefore, by using the described polychromator system 100, more light may be captured by the detector 150 per pixel, thereby increasing the sensitivity of the polychromator system 100, and accordingly, the sensitivity of an instrument, such as a spectrometer, that comprises the described polychromator system 100. Less light tends to fall off the top and bottom pixels of each array of pixels on the detector, thereby increasing the amount of light focused onto the pixels and accordingly improving the detection limits, for example by increasing the signal to noise ratio.

Thus, the described embodiments relate to a polychromator system wherein either one or both of the collimation mirror and the focus mirror is a freeform mirror having a reflective surface configured to mitigate effects of optical aberrations of the polychromator system over a plurality of the wavelengths of the cross-dispersed light along the first axis and the second axis and thereby optimise the resolution of the plurality of aperture images associated with the plurality of the wavelengths along the first axis and the second axis.

In some instances, it may not be possible to improve or optimise the resolution of the polychromator system 100 over the entire wavelength range. Nonetheless, some sub-ranges of the wavelength range or specific wavelengths may be more important than others. The collimation mirror 120 and/or focus mirror 140 may therefore be shaped to improve the resolution at select sub-ranges or specific wavelengths. The effect of the collimation mirror 120 on resolution is further discussed by way of example below.

Referring to FIG. 5, there is shown an example plot of a deviation of the reflective surface 121 of the collimation mirror 120 from a spherical surface centred about the central axis 423. The deviation is represented by a surface 580 that is asymmetric about the central axis 423. As shown, the surface 580 is substantially saddle-shaped and the size of the deviation from the spherical surface at any given point may be up to 20 microns. The reflective surface 121 may therefore be indistinguishable from a spherical mirror to the naked eye. However, it will be appreciated that in other embodiments, the deviation from a spherical surface may be more than 20 microns.

The reflective surface 121 of the collimation mirror 120 of FIG. 5 is described by a polynomial function describing the relationship between position coordinates x, y and a height coordinate z of the reflective surface 121. However, it will be appreciated that reflective surface 121 of the collimation mirror 120 and/or the reflective surface 141 of the focus mirror 140 may be defined using classical X-Y polynomials, Zernike polynomials, Q-polynomials, Chebyshev polynomials, Legendre polynomials, Forbes polynomials, or any other suitable mathematical model.

In one embodiment, the polynomial function may take the form:

$$z(x, y) = \frac{cr^2}{1 + \sqrt{1 - (1+k)c^2 r^2}} + \sum_{i=1}^{35} A_i \times E_i(x, y)$$

$$\text{where } r = \sqrt{x^2 + y^2}$$

where z is the height along the optical axis, x is the position along the first axis 371 and y is the position along the second axis 372. An example of suitable coefficients for the polynomial function are specified in Table 1 below.

TABLE 1

The coefficients $A_i$ on the terms $E_i(x, y)$ may be given by:

A_01 = −4.35257522E−05
A_02 = −1.08132565E−04
A_03 = −6.54995363E−04
A_04 = −1.59362900E−06
A_05 = −6.69079909E−04
A_06 = 4.28208894E−08
A_07 = 1.97315578E.07
A_08 = 8.78702018E−08
A_09 = 6.68454620E−08
A_10 = −3.65271432E−09
A_11 = 1.78134976E−09
A_12 = −6.77381064E−09
A_13 = 1.76562782E−09
A_14 = −3.72012981E−09
A_15 = 2.64433717E−12
A_16 = 3.98605546E−12
A_17 = 7.36181022E−12
A_18 = 5.48617094E−12
A_19 = 4.09694246E−12
A_20 = 1.52573443E−12
A_21 = 1.63504926E−13
A_22 = 1.28582596E−14
A_23 = 4.70452054E−13
A_24 = 1.40445357E−14

TABLE 1-continued

A_25 = 4.65334605E−13
A_26 = 4.13940969E−15
A_27 = 1.53808770E−13
A_28 = 5.63598959E−16
A_29 = 2.69267794E−16
A_30 = 1.04422612E−15
A_31 = 6.60764721E−16
A_32 = 1.42727338E−15
A_33 = 1.47909637E−15
A_34 = 6.40373732E−16
A_35 = 2.32431433E−17

The expansion $E_i(x, y)$ may be a power series. The terms may be:

$E\_01(x, y) = x^1 y^0$
$E\_02(x, y) = x^0 y^1$
$E\_03(x, y) = x^2 y^0$
$E\_04(x, y) = x^1 y^1$
$E\_05(x, y) = x^0 y^2$
$E\_06(x, y) = x^3 y^0$
$E\_07(x, y) = x^2 y^1$
$E\_08(x, y) = x^1 y^2$
$E\_09(x, y) = x^0 y^3$
$E\_10(x, y) = x^4 y^0$
$E\_11(x, y) = x^3 y^1$
$E\_12(x, y) = x^2 y^2$
$E\_13(x, y) = x^1 y^3$
$E\_14(x, y) = x^0 y^4$
$E\_15(x, y) = x^5 y^0$
$E\_16(x, y) = x^4 y^1$
$E\_17(x, y) = x^3 y^2$
$E\_18(x, y) = x^2 y^3$
$E\_19(x, y) = x^1 y^4$
$E\_20(x, y) = x^0 y^5$
$E\_21(x, y) = x^6 y^0$
$E\_22(x, y) = x^5 y^1$
$E\_23(x, y) = x^4 y^2$
$E\_24(x, y) = x^3 y^3$
$E\_25(x, y) = x^2 y^4$
$E\_26(x, y) = x^1 y^5$
$E\_27(x, y) = x^0 y^6$
$E\_28(x, y) = x^7 y^0$
$E\_29(x, y) = x^6 y^1$
$E\_30(x, y) = x^5 y^2$
$E\_31(x, y) = x^4 y^3$
$E\_32(x, y) = x^3 y^4$
$E\_33(x, y) = x^2 y^5$
$E\_34(x, y) = x^1 y^6$
$E\_35(x, y) = x^0 y^7$ c = −0.000640449615604
k = −151.7106420829

Some embodiments relate to a method 1000 of determining an optimised shape for one or more reflective surfaces of one or more respective freeform mirrors for a polychromator system 100. For example, the freeform mirror may be used as a collimation mirror 120 and/or a focus mirror 140 of the polychromator system 100.

In some embodiments, the method 1000 may be a computer implemented method, implemented by a computing system (not shown). For example, the computing system (not shown) may comprise a processor (not shown) and memory (not shown) comprising computer code or instructions, which when executed by the processor, causes the computing system to perform the method 1000.

The method 1000 comprises simulating the polychromator system 100 in accordance with a mathematical model of the polychromator system 100. The model of the polychromator system 100 may comprise a model of the reflective surface of the freeform mirror and one or more models representative of other components of the polychromator system 100. For example, the polychromator system 100 may be simulated using an optical simulation program, such as OpticsStudio™ 16 by Zemax, LLC.

Generally, the method 1000 progressively adjusts coefficients of the model representative of the reflective surface of the freeform mirror, and free parameters of at least some of the components of the polychromator system, which may include the freeform mirror, to optimize the freeform mirror surface and position and thereby reduce the effects of optical aberration and/or image distortion. In particular, in some embodiments, the method provides an optimised shape for a freeform mirror of a polychromator system such that freeform mirror is configured to optimise wavelength resolution of multiple rows of wavelength ranges of cross dispersed light, each row extending along a first axis of a detector of the polychromator system and to optimise order resolution of cross dispersed light along a second axis of the detector of the polychromator system.

The method 1000 comprises initializing a model, such as a mathematical model, of a reflective surface of the freeform mirror, at 1010. In some embodiments, initializing a reflective surface for the freeform mirror comprises selecting values of coefficients of terms in the mathematical model such that the reflective surface approximates a spherical mirror. In some embodiments, the mathematical model is a polynomial function comprising lower order terms and one or more higher order terms. The base curvature and/or conic constant may be defined by the lower order terms of the polynomial function. Initialising the reflective surface for the simulation may comprise assigning zero value coefficients for the higher order terms.

In some embodiments, where the polychromator system 100 is to comprise two freeform mirrors, for example, corresponding to the collimator and the focus mirror, respectively, the method comprises initialising a first model of a first reflective surface of the first freeform mirror (to be used as the collimator) and initialising a second model of a second reflective surface of the second freeform mirror (to be used as the focus mirror), at 1010.

The method 1000 further comprises simulating an aperture image at each of two or more wavelengths of light, at 1020.

At 1030, the method 1000 comprises determining a location of the aperture image at each of the two or more of the wavelengths of light.

At 1035, the method comprises determining whether the location of the (simulated) aperture image of the two or more wavelengths of light is located on the detector surface 151. Accordingly, the location of the aperture image is determined relative to the detector surface 151 of the detector 150 in a simulated polychromator system.

At 1040, responsive to determining that the locations of the aperture image of the two or more wavelengths of light are not located on the detector surface 151, adjusting the model of the reflective surface of the freeform mirror to adjust a shape (or curvature) of the reflective surface. In some embodiments, adjusting the model of the reflective surface of the freeform mirror comprises adjusting one or more coefficients of terms of the model. For example, one or more of the higher order terms of polynomial function may be modified to approximate a reflective surface suitable for use as a collimator or focus mirror. In embodiments where two freeform mirrors are being optimised, adjusting the model of the reflective surface of the freeform mirror comprises adjusting one or more coefficients of the first model of the first reflective surface and/or one or more coefficients of the second model of the second reflective surface.

In some embodiments, the method comprises adjusting free parameters of at least some of the components of the polychromator system at 1045, such as rotations and displacements of other optical components relative to one another and/or the freeform mirror, in response to determining that at least one of the aperture images is not located on the detector surface 151.

At 1050, responsive to determining that the location of the (simulated) aperture image of the two or more wavelengths of light is located on the detector, determining properties for or characteristics of the aperture image at the two or more wavelengths of light. The properties or characteristics may include any one or more of: one or more dimensions of the aperture image, intensity of light in the aperture image, and location of the aperture image on the detector surface 151.

For example, the one or more dimensions may comprise the Full-Width at Half Maximum intensity (FWHM) of the aperture image over one or both of the first axis 371 and the second axis 372. For example, for a trapezoidal aperture 111, the aperture image may be shaped as a rectangle about 25 microns wide and about 50 microns in height.

At 1060, the method comprises calculating a merit value according to a merit function based on comparing the determined properties or characteristics with corresponding properties or characteristics of a target image or reference image.

In some embodiments, the merit function is defined by a comparison of the determined dimensions of the simulated aperture image with the dimensions of a target image. For example, the merit value may be reduced when the dimension(s) of the simulated aperture image is closer to the dimension(s) of the target image scaled by a scaling factor. The scaling factor is representative of the polychromator system 100 comprising one or more powered mirrors which scale the dimensions of the aperture image relative to the aperture 111. In some embodiments, the scaling factor may be a value of 1 in which case the dimensions of the aperture image match the dimensions of the aperture 111.

The merit value may be a measure of the difference between the dimensions of the simulated aperture image and the target image. For example, the merit value may be a measure of the difference between the FWHM of the simulated aperture image and the FWHM of the target image over one or two axes. Alternatively, the merit value may be a measure of the ratio between the FWHM of the simulated aperture image and the FWHM of the target image over one or two axes.

In some embodiments, the merit function is defined by a comparison of the simulated intensity contained within the aperture image with the intensity of the target image. For example, the merit value may be reduced when the simulated aperture intensity is closer to the intensity value of the image. The merit value may be a measure of the difference between the simulated aperture image intensity and the target image intensity or the simulated aperture image power and the target image. Alternatively, the merit value may be a measure of the ratio between the simulated aperture image intensity and the target image intensity In some embodiments, the merit function is defined by a comparison of the simulated aperture locations at two or more wavelengths with a target image locations of the two or more wavelengths. For example, the merit value may be reduced when the locations of the simulated aperture image are closer to the locations of the target image. The merit value may be a measure of the difference between the simulated aperture image locations and the target image locations. For example, the merit value may be a measure of the difference between the image locations of the simulated aperture image and the image locations of the target image over one or two dimensions. Alternatively, the merit value may be a measure of the ratio between the image locations of the simulated aperture image and the image locations of the target image over one or two dimensions.

In some embodiments, the target image represents dimensions of a desired aperture image to be produced on the detector using the polychromator system 100. For example, the target image may be indicative of an image produced by the polychromator system when wavelength resolution of multiple rows of wavelength ranges of cross dispersed light extending along the first axis 371 of the detector of the polychromator system is optimised and order resolution of cross dispersed light along the second axis 372 of the detector of the polychromator system is optimised. The target image may represent a theoretical aperture image where there is no optical aberration and/or image distortion or a theoretical minimum amount of optical aberration and/or image distortion.

In some embodiments, the merit function is based on a comparison of the simulated aperture image with a reference image. The reference image may be the simulated aperture image of the initialised model. The merit function may, for example, be defined by a comparison of the simulated aperture image with a reference image such that the merit value is reduced when the dimension(s) of the simulated aperture image are reduced when compared to the dimension(s) of the reference image. In some embodiments, the merit value may be reduced when the intensity of the simulated aperture image is increased when compared to the respective intensity of the reference image. In some embodiments, the merit value may be reduced when the location of the simulated aperture image is closer to the location of the reference image.

In some embodiments, the reference image is a dynamic image and method 1000 may comprise adjusting properties or characteristics of the reference image to tailor or customise the freeform mirror in a particular way. For example, if it were determined that UV wavelengths were more important than visible wavelengths, the method 100 may comprise adjusting properties or characteristics of the reference image to produce a reference image that is indicative of an improved response of a freeform mirror to UV wavelengths at the expense of how it responds to visible wavelengths.

At 1065, the method comprises comparing the merit value to a threshold value. In some embodiments, the comparison comprises determining whether the merit value is greater than a threshold value.

Responsive to the merit value being greater than a threshold value, the method 1000 comprises again adjusting the coefficients of the model of the reflective surface of the freeform mirror to adjust a shape (or curvature) of the reflective surface at 1040 and/or adjusting additional free parameters of at least some of the components in the polychromator system at 1045 (which may include the freeform mirror(s)). In some embodiments, if the merit value is equal to the threshold value, the model and/or additional free parameters are adjusted.

At 1080, responsive to the merit value being less than a threshold value, the method 1000 comprises determining that the shape for the reflective surface of the freeform mirror is optimised. In some embodiments, if the merit value is equal to the threshold value, the shape is determined to be optimised.

In some embodiments, responsive to adjustments to the coefficients of the model for the freeform mirror and/or adjustments to free parameters of at least some of the polychromator system 100 being ineffective to further reduce the merit value to below a threshold or target value, for example, after a predetermined period of time has elapsed since the simulation was initiated and/or a predetermined number of adjustments have been made, the method 1000 comprises determining that the reflective surface of the freeform mirror is optimised for the polychromator system 100. For example, it may be determined that further adjustments to the model of the freeform mirror are substantially ineffective to further reduce the merit value and that the merit value has converged and that the model is representative of a locally optimised freeform mirror where the effect of optical aberrations and/or image distortions on the aperture image is reduced compared to the initialised freeform mirror(s).

Some embodiments relate to a method of fabricating a freeform mirror for the polychromator system 100 comprising performing the method 1000 of determining an optimised shape for a reflective surface of a freeform mirror for a polychromator system and fabricating the freeform mirror according to the determined optimised shape.

Referring to FIGS. 6a and 6b and FIGS. 7a and 7b, there is shown examples of aperture images 652, 753 projected onto respective areas 352, 353 of the detector surface 151 of the detector 150 and associated intensity profiles. The aperture images were simulated using optical simulation software such as OpticsStudio™ 16 by Zemax, LLC.

Figure 6A:
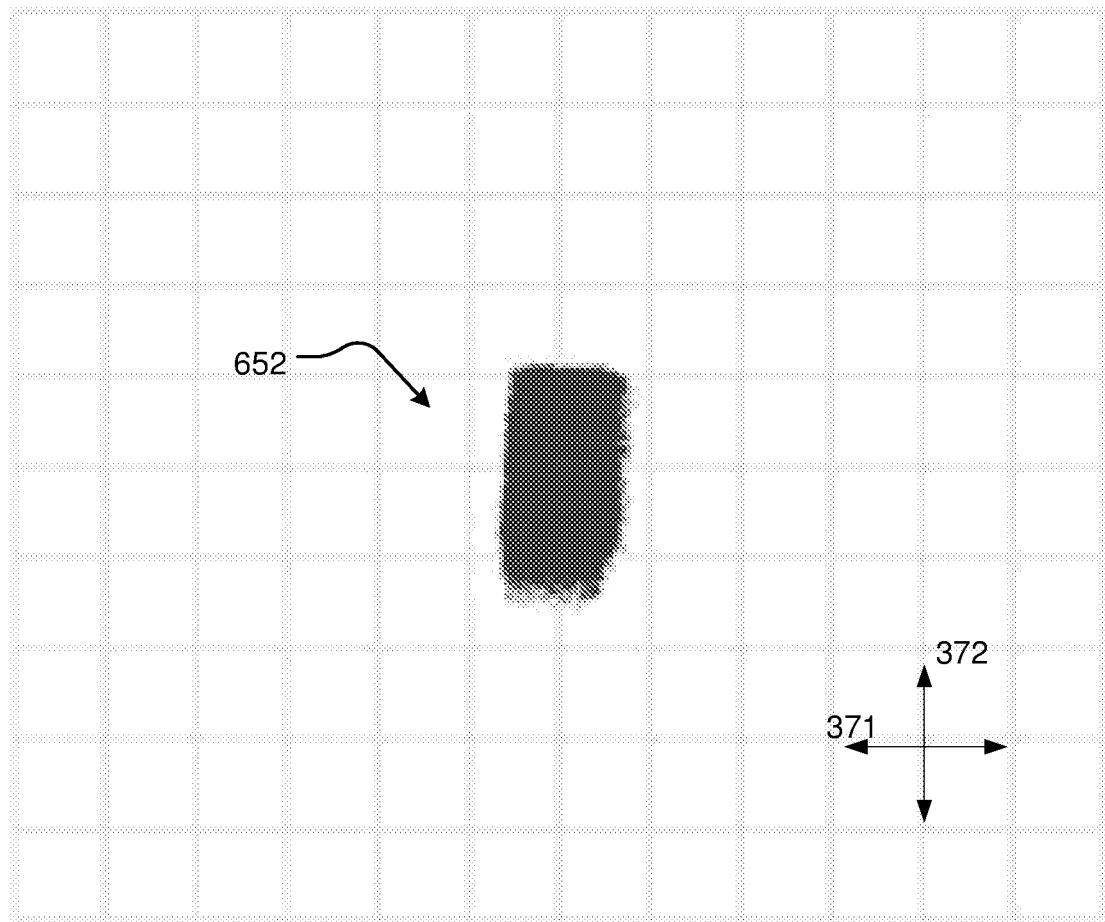
FIG. 6a is an aperture image associated with a relatively short wavelength of light produced by the polychromator system of FIG. 1.
Figure 6B:
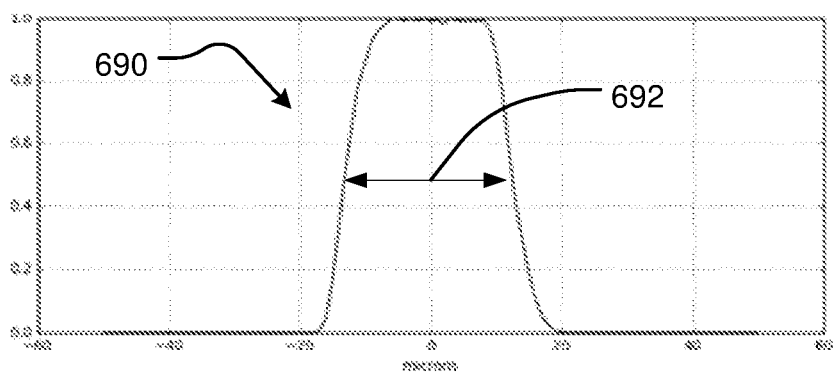
FIG. 6b is an intensity profile for the aperture image of FIG. 6a along a first axis.

Referring to FIGS. 6a and 6b, the aperture image 652 was simulated for light with a wavelength of about 213.857 nm using the system 100, wherein the optical element 110 comprises a trapezoidal aperture 111, the collimation mirror 120 comprises a reflective surface 121 described by a polynomial according to coefficients in Table 1, and the focus mirror 140 comprises a spherical reflective surface 141.

Figure 8A:
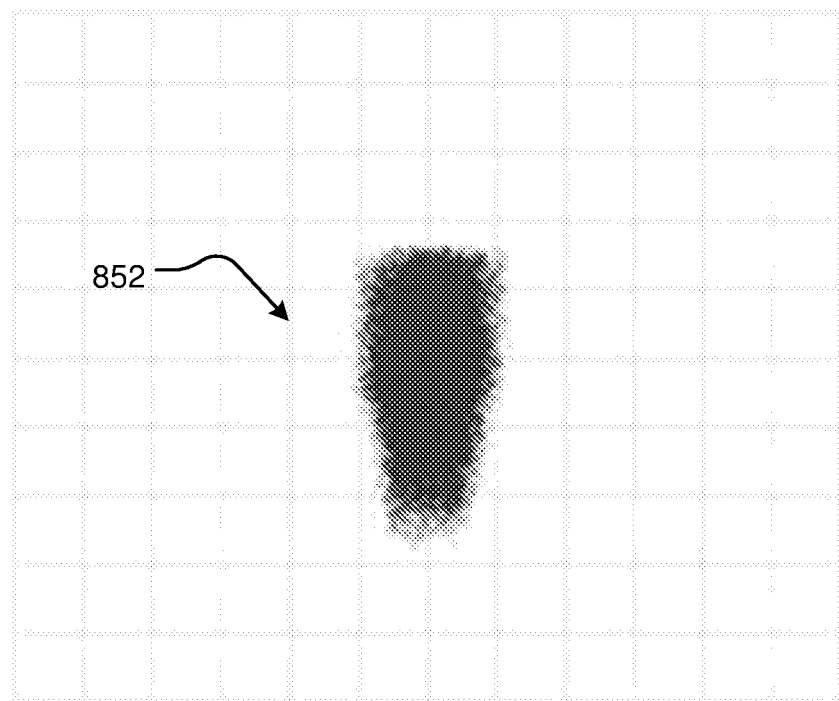
FIG. 8a is an aperture image associated with a relatively short wavelength of light produced by a polychromator system comprising a collimation mirror having a parabolic reflective surface and a focus mirror having a parabolic reflective surface.
Figure 8B:
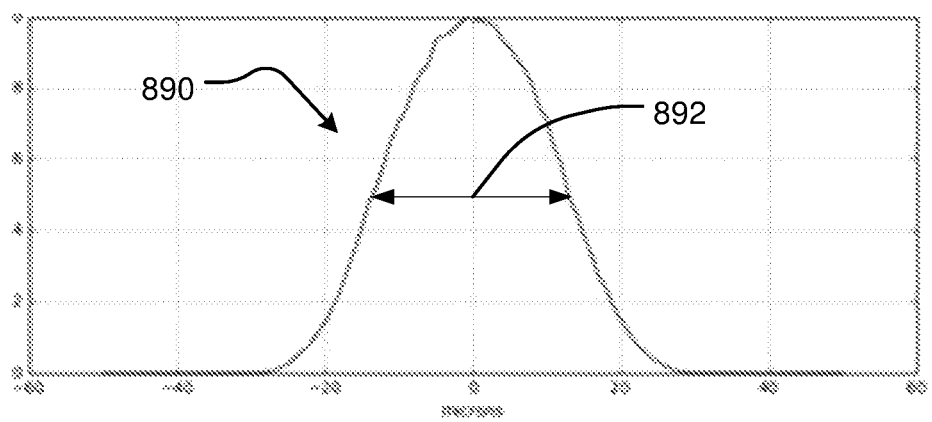
FIG. 8b is an intensity profile for the aperture image of FIG. 8a along the first axis.

The aperture image is an image of a trapezoidal aperture 111 of the optical element 110 of the system 100 projected onto the detector surface 151. The shape of the aperture image is not an exact replica of the trapezoidal shape of the aperture 111 due to optical aberrations and/or image distortions of the system 100, such as spherical aberrations, for example, due to the spherical focus mirror 140 and/or image shearing due to the first and second dispersive optical elements 130, 132. The angles of the trapezoidal shape of the aperture 111 were designed to match the shearing distortion of the system 100 to produce a rectangular shaped image at the detector 150. Simulations show that for about 213.857 nm wavelength light, the full-width at half maximum (FWHM) 692 of the light intensity profile 690 through the centre of the aperture image along the first axis 371 is similar to the simulated FWHM 892 of a light intensity profile 890 (FIG. 8b) through the centre of an aperture image 852 (FIG. 8a) produced where the system 100 comprises a collimation mirror 120 having a parabolic reflective surface and a focus mirror having a parabolic reflective surface. For example, the difference between the two FWHMs may be about 3%. However, the FWHM of the light intensity profile through the centre of the aperture image along the second axis 372 is about 30% smaller than the simulated FWHM produced where the system 100 comprises a collimation mirror 120 having a parabolic reflective surface and a focus mirror 140 having a parabolic reflective surface. In some embodiments, the FWHM of the light intensity profile at 213.857 nm through the centre of the aperture image along the second axis 372 is about 35% smaller than the simulated FWHM produced where the system 100 comprises a collimation mirror 120 having a parabolic reflective surface and a focus mirror 140 having a parabolic reflective surface.

Figure 7A:
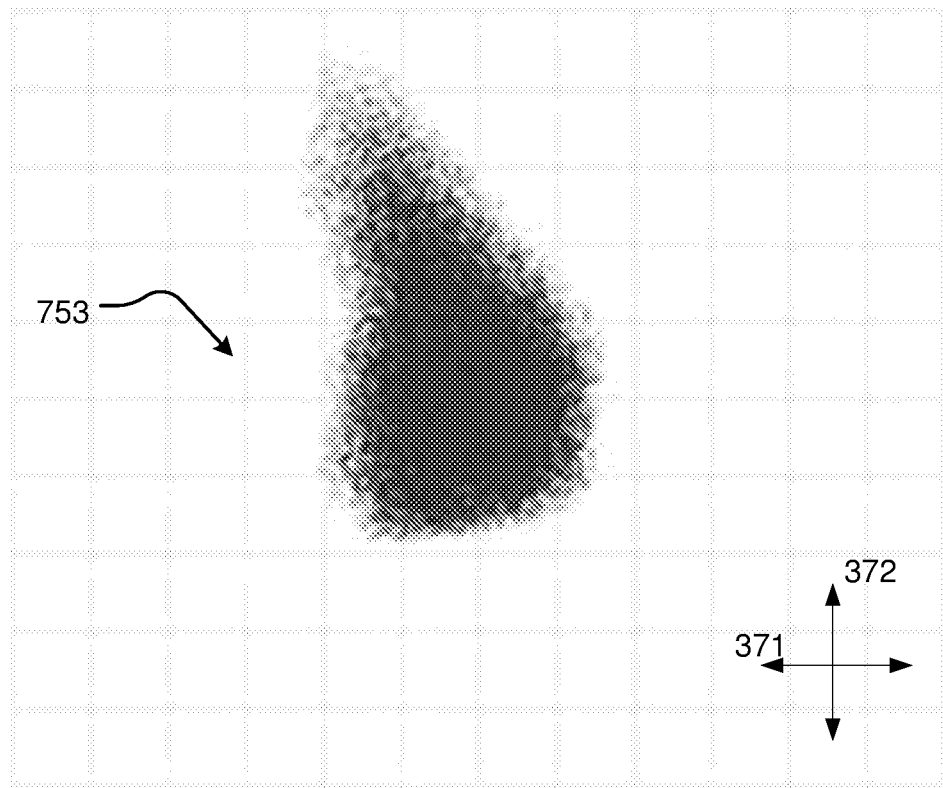
FIG. 7a is an aperture image associated with a relatively long wavelength of light produced by the polychromator system of FIG. 1.
Figure 7B:
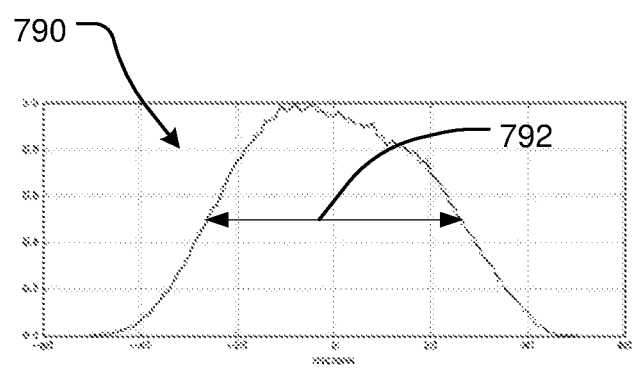
FIG. 7b is an intensity profile for the aperture image of FIG. 7a along the first axis.

Referring to FIGS. 7a and 7b, the aperture image 753 was simulated for light with a wavelength of about 766.491 nm using the system 100 wherein the optical element 110 comprises a trapezoidal aperture 111, the collimation mirror 120 comprises a reflective surface 121 described by a polynomial according to coefficients in Table 1, and the focus mirror 140 comprises a spherical reflective surface 141.

Figure 9A:
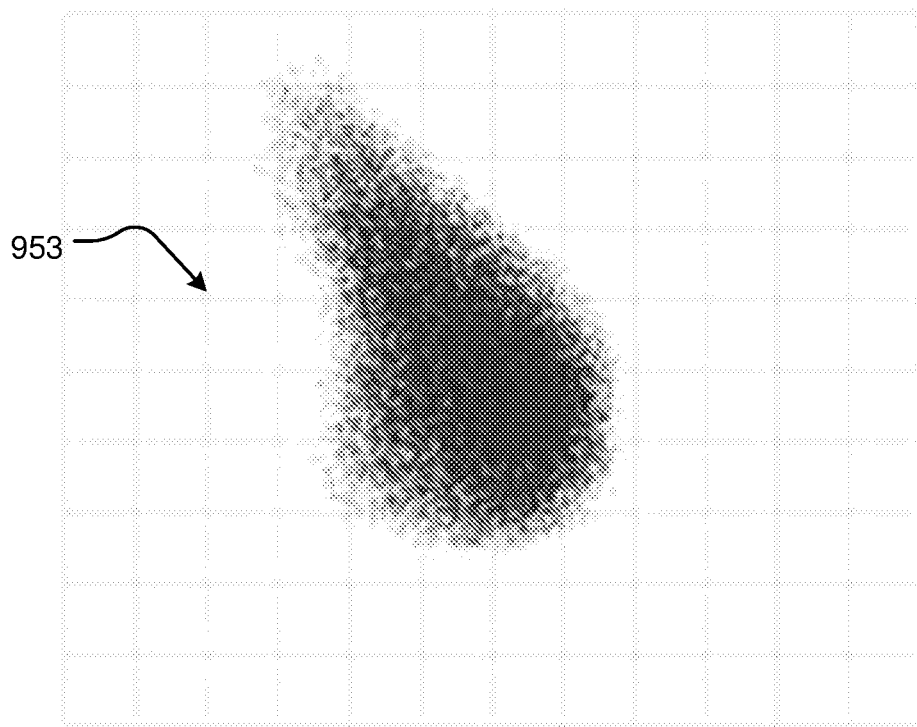
FIG. 9a is an aperture image associated with a relatively long wavelength of light produced by a polychromator system comprising a collimation mirror having a parabolic reflective surface and a focus mirror having a parabolic reflective surface.
Figure 9B:
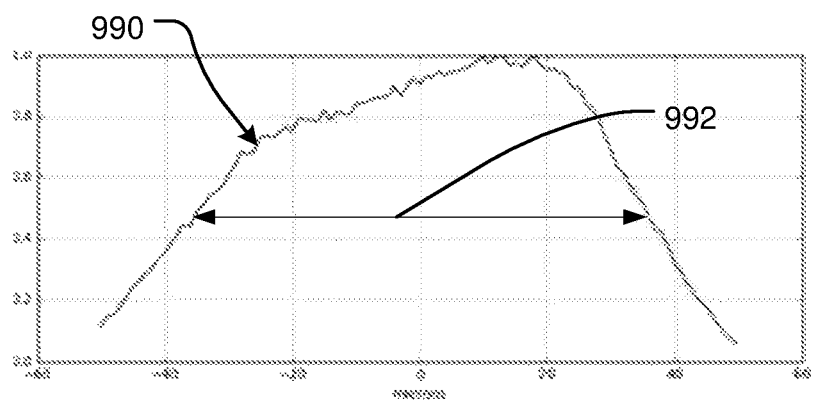
FIG. 9b is an intensity profile for the aperture image of FIG. 9a along the first axis.
Figure 10:
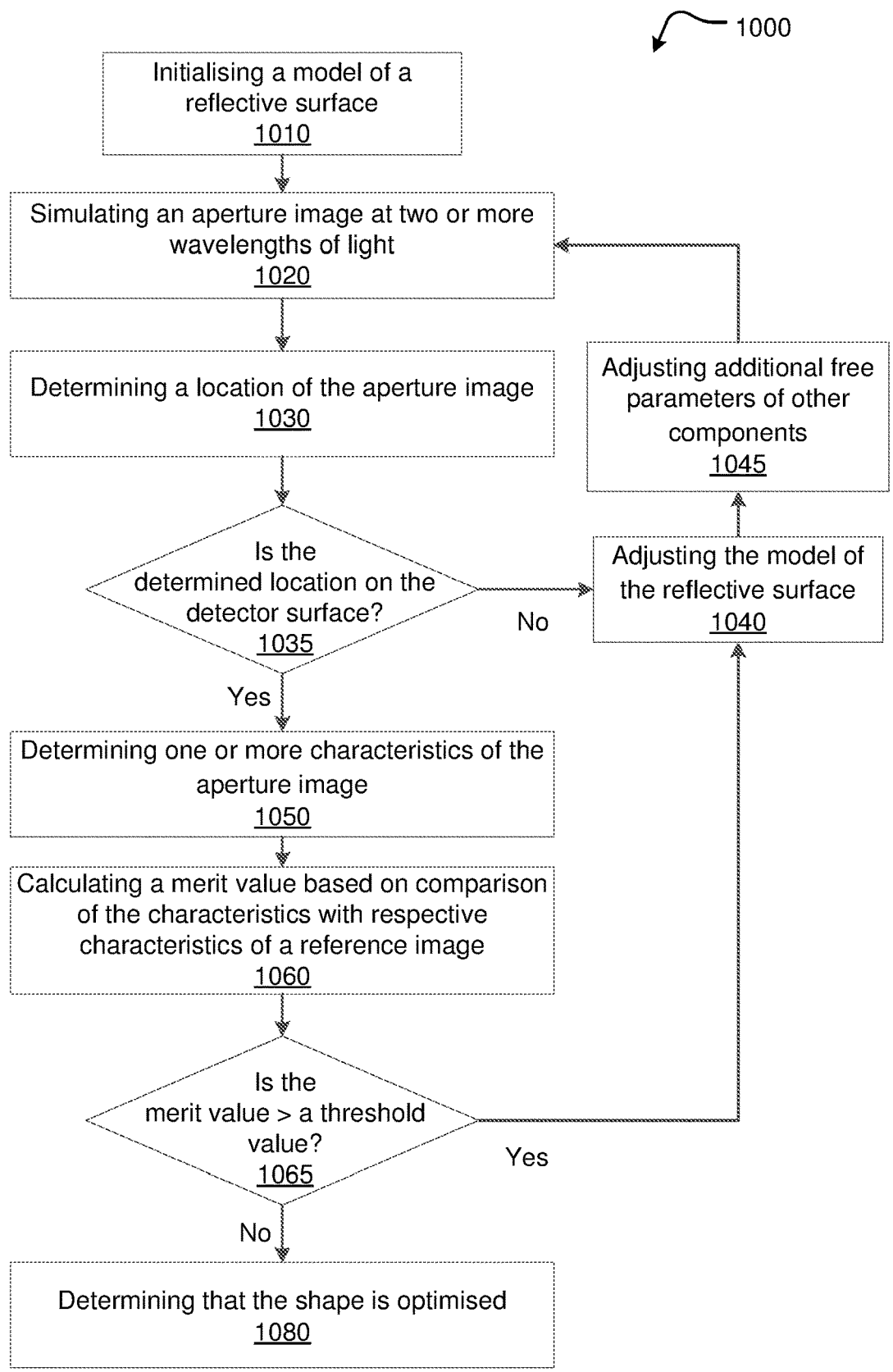
FIG. 10 is a flowchart for a method of determining an optimised shape for a freeform mirror for a polychromator or polychromator system, according to some embodiments.

The aperture image 753 corresponds to an image of a trapezoidal aperture 111 of the optical element 110 of the polychromator system projected onto the detector surface 151 away from the ideal optical axis (not shown) of the system 100. The shape of the aperture image 753 is not the trapezoidal shape of the aperture 111 due to optical aberrations such as coma aberrations. However, simulations show that, for about 766.491 nm wavelength light, the full-width at half maximum (FWHM) 792 of the light intensity profile 790 through the centre of the aperture image 753 along the first axis 371 is smaller than the simulated FWHM 992 of a light intensity profile 990 (FIG. 9b) through the centre of an aperture image 953 (FIG. 9a) produced when the system 100 comprises a collimation mirror 120 having a parabolic reflective surface and a focus mirror having a parabolic reflective surface. For example, the difference between the two FWHMs may be about 25%. The FWHM of the light intensity profile through the centre of the aperture image along the second axis 372 is about 25% smaller than the simulated FWHM produced where the system 100 comprises a collimation mirror 120 having a parabolic reflective surface and a focus mirror 140 having a parabolic reflective surface. In some embodiments, the FWHM of the light intensity profile at 766.491 nm through the centre of the aperture image along the second axis 372 is about 3% smaller than the simulated FWHM produced where the system 100 comprises a collimation mirror 120 having a parabolic reflective surface and a focus mirror 140 having a parabolic reflective surface.

The shape of the reflective surface 121 of the collimation mirror 120 and/or the shape of the reflective surface 141 of the freeform focus mirror 140 may be optimised to increase the resolution of the system 100 over as many wavelengths as possible over a predetermined wavelength range. For example, the wavelength range may be from 165 nm to 800 nm.

Increasing the resolution of system 100 by optimising the shape of the reflective surface 121 of collimation mirror 120 and/or shape of the reflective surface 141 of the focus mirror 140 may increase the intensity of light detected by detector 150 and thereby increase the signal-to-noise and detection efficiency of a spectrometer comprising the polychromator system 100. Although reducing the size of the aperture 111 of the optical element 110 may also increase the resolution of the polychromator system 100, it would also decrease the light intensity and therefore may also reduce the signal-to-noise ratio.

Controlling the optical aberrations of the polychromator system 100 using a freeform collimation mirror 120 and/or freeform focus mirror 140 may enable the overall physical size of the system 100 to be reduced. The focal length of the polychromator system 100 may be reduced, resulting in a shorter optical path length, smaller optical components, and larger angles of reflection between optical components without degrading resolution due to worsening optical aberrations.

In some embodiments, the collimation mirror 120 may be fabricated from metallic materials to produce an optimised reflective surface 121 and/or the focus mirror 140 may be fabricated from metallic materials to produce a reflective surface 141 using single point diamond turned Computer Numerical Control (CNC) of a lathe or mill. In other embodiments, the collimation mirror 120 and/or focus mirror 140 may be fabricated from glass materials with a magneto-rheological finishing process used to polish the final shape of the reflective surfaces 121 for the collimating mirror 120 and/or the final shape of the reflective surface 141 of the focus mirror 140. Replication or injection moulding may also be used to fabricate the collimation mirror 120 and/or freeform focus mirror 140.

The reflective surface 121 of the collimation mirror 120 and/or the reflective surface 141 of the focus mirror 140 may be fabricated within particular tolerances such as sag and slope errors. The sag error is the deviation of the reflective surface 121 from the optimised design. In some embodiments, the tolerance in sag error may be less than a quarter of a reference wavelength at every point on the reflective surface 121. For example, the sag error may be specified relative to a reference wavelength of 632.8 nm and therefore less than about 160 nm. The slope error is the deviation between the reflective surface 121 and the optimised surface over a particular distance. In some embodiments, the slope error may be less than a reference wavelength divided by 15 per cm over the surface, i.e., less than about 42 nm/cm (relative to the reference wavelength of 632.8 nm).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:
1. A polychromator system comprising:
an optical element defining an aperture;
a collimation mirror for receiving light via the aperture and reflecting substantially collimated light, wherein the reflective surface of the collimation mirror is described by:

$$z(x, y) = \frac{cr^2}{1 + \sqrt{1 - (1+k)c^2r^2}} + \sum_{i=1}^{35} A_i \times E_i(x, y)$$

where $r = \sqrt{x^2 + y^2}$, and where z is the height along an optical axis, x is the position along first axis and y is position along the second axis;
at least a first dispersive optical component and a second dispersive optical component, each configured to disperse the substantially collimated light received from the collimation mirror by different amounts for different wavelengths and to provide cross-dispersed light having different wavelengths of light spaced along a first and second axis; and
a focus mirror positioned to focus the cross-dispersed light onto a 2-D array detector to provide a plurality of aperture images of the aperture at a respective plurality of regions of the detector, each of the plurality of aperture images associated with a respective wavelength of the cross-dispersed light;

wherein either one or both of the collimation mirror and the focus mirror is a freeform mirror having a reflective surface configured to mitigate effects of optical aberrations of the polychromator system over a plurality of the wavelengths of the cross-dispersed light along the first axis and the second axis and thereby optimize the resolution of the plurality of aperture images associated with the plurality of the wavelengths along the first axis and the second axis.

2. The polychromator system of claim 1, wherein the second optically dispersive element is oriented relative to the first optically dispersive element such that the second axis is substantially perpendicular to the first axis.

3. The polychromator system of claim 1,
wherein the first dispersive optical component is configured to receive collimated light from the collimation mirror and to disperse the substantially collimated light by different amounts for different wavelengths along the first axis to provide dispersed light; and
wherein the second dispersive optical component is configured to further disperse the dispersed light by different amounts for different wavelengths along the second axis to provide the cross-dispersed light.

4. The polychromator system of claim 1, wherein the first dispersive optical element is configured to separate the light into a dispersed spectrum with overlapping orders along the first axis and the second dispersive optical element is configured to separate the light into different order spectra along the second axis.

5. The polychromator system of claim 1, wherein the second dispersive optical element is configured to separate the light into a dispersed spectrum with overlapping orders along the second axis and the first dispersive optical element is configured to separate the light into different order spectra along the first axis.

6. The polychromator system of claim 1, wherein the first dispersive optical component comprises a diffraction grating and the second dispersive optical component comprises a prism.

7. The polychromator system of claim 1, wherein the second dispersive optical component comprises a diffraction grating and the first dispersive optical component comprises a prism.

8. The polychromator system of claim 1, wherein the first dispersive optical component comprises a first diffraction grating and the second dispersive optical component comprises a second diffraction grating.

9. The polychromator system of claim 1, wherein the collimation mirror is a freeform mirror and the focus mirror is any one of: (i) a spherical concave mirror, (ii) a toric concave mirror, and (iii) a parabolic concave mirror.

10. The polychromator system of claim 1, wherein the focus mirror is a freeform mirror and the collimation mirror is any one of: (i) a spherical concave mirror, (ii) a toric concave mirror, and (iii) a parabolic concave mirror.

11. The polychromator system of claim 1, wherein the reflective surface of either one or both of the collimation mirror and focus mirror is described by a polynomial.

12. The polychromator system of claim 1, wherein the second dispersive optical component is further configured to provide the cross-dispersed light to the first dispersive optical component and the first dispersive optical component is configured to disperse the wavelengths further along the first axis and to provide the further cross-dispersed light to the focus mirror.

13. A method of optimizing a reflective surface of a freeform mirror for a polychromator system, the method comprising:
(i) initializing a model of the reflective surface of the freeform mirror;
(ii) simulating an aperture image at two or more wavelengths of light;
(iii) determining a location of the aperture image relative to a detector surface of a simulated detector of the polychromator system;
(iv) responsive to determining that the aperture image is not located on the detector surface, adjusting the model of the reflective surface of the freeform mirror to adjust a shape of the reflective surface;
(v) responsive to determining that the aperture image is located on the detector surface, determining one or more characteristics of the aperture image at the two or more wavelengths of light;
(vi) calculating a merit value based on a comparison of the one or more characteristics of the aperture image with respective one or more characteristics of a reference image;
(vii) responsive to determining that the merit value exceeds a threshold value, repeating steps (iv) to (vi); and
(viii) responsive to determining that the merit value is less than a threshold value, determining that the reflective surface of the freeform mirror is optimized.

14. The method of claim 13, wherein adjusting the model of the reflective surface comprises adjusting one or more coefficients of terms of the model.

15. The method of claim 14, wherein initializing the model comprises selecting coefficients of terms of the model such that the reflective surface approximates a spherical mirror.

16. The method of claim 13, wherein initializing a model of a reflective surface of the freeform mirror comprises initialising a first model of a first reflective surface of the first freeform mirror and initialising a second model of a second reflective surface of the second freeform mirror and wherein adjusting the model of the reflective surface comprises adjusting one or more coefficients of terms of the first model of the first reflective surface and/or one or more coefficients of terms of the second model of the second reflective surface.

17. The method of claim 13, comprising responsive to determining that a predetermined number of adjustments to the model have been made and/or a predetermined period of time has elapsed since the simulation was initiated, determining that the reflective surface of the freeform mirror is optimized.

18. The method of claim 13, further comprising simulating the polychromator system according to a simulation model, wherein the simulated model comprises the model of the reflective surface of the freeform mirror and one or more models representative of other components of the polychromator system.

19. The method of claim 18, further comprising adjusting free parameters of the model of the reflective surface of the freeform mirror and/or the one or more models of the other components of polychromator system in response to determining that at least one of the aperture images is not located on the detector surface.

* * * * *